United States Patent
Nakamura et al.

(10) Patent No.: US 6,580,201 B2
(45) Date of Patent: Jun. 17, 2003

(54) UMBER PAINT FOR TURN SIGNAL LAMPS AND BULBS COATED THEREWITH

(75) Inventors: Koichi Nakamura, Shizuoka (JP); Midori Ishikawa, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 09/892,514

(22) Filed: Jun. 28, 2001

(65) Prior Publication Data

US 2002/0000778 A1 Jan. 3, 2002

(30) Foreign Application Priority Data

Jun. 28, 2000 (JP) .................................... P.2000-194429

(51) Int. Cl.$^7$ .................................................. H01J 1/88
(52) U.S. Cl. ...................... 313/112; 313/635; 362/311; 362/293; 428/403
(58) Field of Search ................... 313/634, 635, 313/315, 316, 110, 112, 568, 569, 578, 579, 580, 489; 362/311, 293; 427/106, 107; 428/403

(56) References Cited

U.S. PATENT DOCUMENTS 4,782,153 A * 11/1988 Rochat et al. ................. 546/81
6,411,021 B1 * 6/2002 Izawa et al. ................. 313/315

FOREIGN PATENT DOCUMENTS

JP 9124976 * 5/1997

* cited by examiner

Primary Examiner—Ashok Patel
(74) Attorney, Agent, or Firm—Sughrue Mion, PLLC

(57) ABSTRACT

An umber paint, which is excellent in transparency and heat resistance, and which does not bring about environmental pollution, bulbs coated with the umber paint, and turn signal lams equipped with the bulbs. The umber paint, for turn signal lamps, contains at least a red pigment 10a and a yellow pigment 10b, wherein the yellow pigment comprises acetylacetone metal chelateumber.

10 Claims, 5 Drawing Sheets

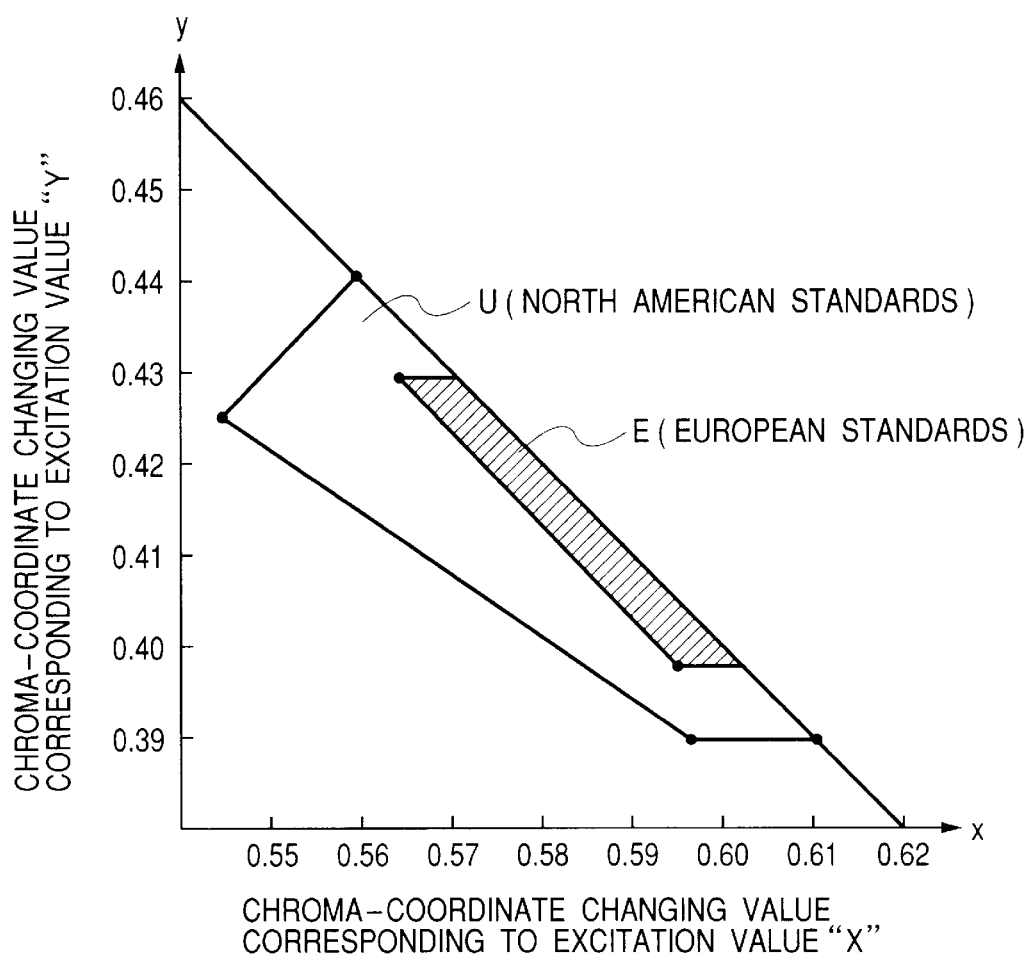

UMBER PAINT FOR TURN SIGNAL LAMPS AND BULBS COATED THEREWITH

BACKGROUND OF THE INVENTION

1. Technical Field of the Invention

The invention relates to a technology for an umber paint to be coated on surfaces of bulbs to be used in lamps of vehicles and, more particularly, to an umber paint excellent in transparency and heat resistance without bringing about environmental pollution, yet suited to coating glass surfaces of bulbs to be used in turn signal lamps. Further, the present invention related to an improved technology of bulbs coated with the umber paint.

2. Related Prior Art

There are furnished turn signal lamps at the front, rear and both sides of vehicles such as cars. The turn signal lamps are used when a vehicle starts, changes running routes, turns left or right. The turn signal lamp changes a white light issued from a bulb (such as an incandescent lamp provided within the lamp) into an umber light (orange-colored light), and turns on and off an umber light so as to let pedestrians or other cars know a driving course.

There are known several methods of changing to umber color the lights issued from bulbs, which methods have conventionally been employed on turn signal lamps. A first prior art furnishes caps (umber caps) of an umber color to bulbs of a transparent monochrome color. A second prior art directly coats a colored paint (coating agent, containing chromium based pigment) on the glass surfaces of the bulbs.

The above-described prior art has been developed for coloring front lenses of turn signal lamps, so that when strong lights as a brilliant sun ray shine on the lamps, it is easier to see when the monochrome bulbs turn on and off. However, even with such coloration, it is difficult for following cars to recognize when the bulbs are on and when they are off.

SUMMARY OF THE INVENTION

1. Problems Solved by the Invention

However, in the prior art, there are still technical problems to be solved.

In the first prior art, since the umber caps are added to parts of the turn signal lamps, the number of parts increases thereby increasing cost. Also, because a holding structure is necessary for mounting the umber caps, structural limitations increase.

The second prior art has a basic problem in that the heat resistance of the coated film formed on the bulb surface is low. Further, since colored paints containing chromium-based pigment are used, and because cadmium is added to the paint for increasing its heat resistance, environmental problems occur.

Therefore, it is an object of the present invention to offer an umber paint that is excellent in transparency and heat resistance without bringing about environmental pollution. It is another object of the invention to provide bulbs of high quality coated with the umber paint, and turn signal lamps of high visibility.

For accomplishing the above and other objects, the following aspects of the invention are employed.

A first aspect of the invention is to offer an umber paint, for a turn signal, containing at least a red pigment and a yellow pigment, wherein the yellow pigment comprises acetylacetone metal chelate.

This aspect abolishes employment of conventional indoline-based, Chinacdoline-, metal complex azo-, transparent red oxide yellow-, or condensed azo-based pigments, which were used as a yellow pigment for mixing with a red pigment for making an umber color. Instead this aspect of the invention uses a new pigment composed of acetylacetone metal chelate.

The acetylacetone metal chelate is a chemical compound in which acetylacetonate ligand is chelate-ligated in a metallic ion as an iron. Because this acetylacetone metal chelate is especially excellent in transparency, it easily shields a light issued from a bulb (filament), does not lower brightness, and smoothens out heat dissipation.

In the umber paint for turn signal lamps, according to a second aspect of the invention, for the red pigment set forth in the first aspect there is used a red iron oxide pigment ($\alpha$-$Fe_2O_3$). Further, the second aspect defines the weight ratio of the red iron oxide pigment to the yellow pigment comprising acetylacetone metal chelate as being within the range of from 1:1.5 to 1:2.8.

According to this aspect, in the X and Y coordinates of XYZ color system, conditions of chromaticity expressed by the following formulae can be satisfied $$0.398 \leq y \leq 0.429 \tag{I}$$

$$z \leq 0.007 \tag{II}$$

$$x+y+z=1 \tag{III}$$

If these conditions are not satisfied, the chromaticity—when lighting the turn signal lamps—does not satisfy the European standards (ECE Reg. No. 37), which are more strict than the North American standards (SAE Standards of Chromaticity J 588). Incidentally, x, y, z of the above formulae (I) to (III) indicate the changing values of the chromaticity coordinate in response to X, Y, Z of three excitation values in colors of a light source.

A third aspect of the invention adds zirconium oxychloride, as a dispersing agent, to the umber paint for turn signal lamps as set forth in either one of the first and second aspects. The third aspect of the invention mainly is aimed at increasing the quantity of light by improving transparency. Because zirconium oxychloride functions to increase the paint transparency, heat dissipation within the bulb is smoother. And it is assumed that the more smooth heat dissipation contributes to an improvement of the bulb's heat resistance.

A fourth aspect of the invention is a bulb that is coated on the surface thereof with the umber paint as set forth in any one of the first to third aspects.

Using the bulb obtained by this aspect, a turn signal lamp achieves excellent endurance (heat resistance) and improved visibility.

A fifth aspect of the invention further defines the bulb, as set forth in the fourth aspect, as having a film thickness—of the umber paint coated on the bulb surface—in the range of 1.5 $\mu$m to 3.0 $\mu$m.

When the film thickness is less than 1.5 $\mu$m, a chromaticity satisfying various standards cannot be provided. On the other hand, when the film thickness is more than 3.0 $\mu$m, cracks easily occur in a coated film. Thus, according to the present aspect, it is possible both to secure a proper chromaticity, and to avoid cracks.

In a sixth aspect of the invention, the bulb set forth in either one of the fourth and fifth aspects includes luminous parts that are double filaments.

According to this aspect, it is possible to secure a desired endurance (heat resistance) and visibility, even in bulbs of double filaments wherein there is an increased temperature when turned on. Accordingly, turn signal lamps furnished with the inventive bulbs can maintain a high luminous intensity of orange colored light (issued from the bulbs), and can have excellent visibility.

As mentioned above, since the umber paint of the present invention has excellent transparency and heat resistance, without bringing about environmental pollution, the invention is technically significant. When embodied as a bulb coated with the umber paint, the present invention improves the quality of a turn signal lamp furnished with this bulb and, in turn, heightens the visibility of the turn signal lamp. Thus, the invention has technical meaning in increasing traffic safety of vehicles.

BRIEF DESCRIPTION OF THE DRAWINGS

The above and other objects and advantages of the present invention will become more apparent by describing in detail preferred exemplary embodiments thereof with reference to the accompanying drawings, wherein like reference numerals designate like or corresponding parts throughout the several views, and wherein:

FIG. 5 is a graph showing, in a vertical axis, the "y" component of x, y, z (the chromaticity coordinate changing values), and showing in a horizontal axis, the "X" component in correspondence to X Y, Z (the three excitation values in colors of the light source).

DETAILED DESCRIPTION OF THE PREFERRED EMBODIMENTS

1. Mode for Carrying Out the Invention

Explanation will be made to modes for carrying out the invention, with reference to the accompanying drawings.

Figure 1:
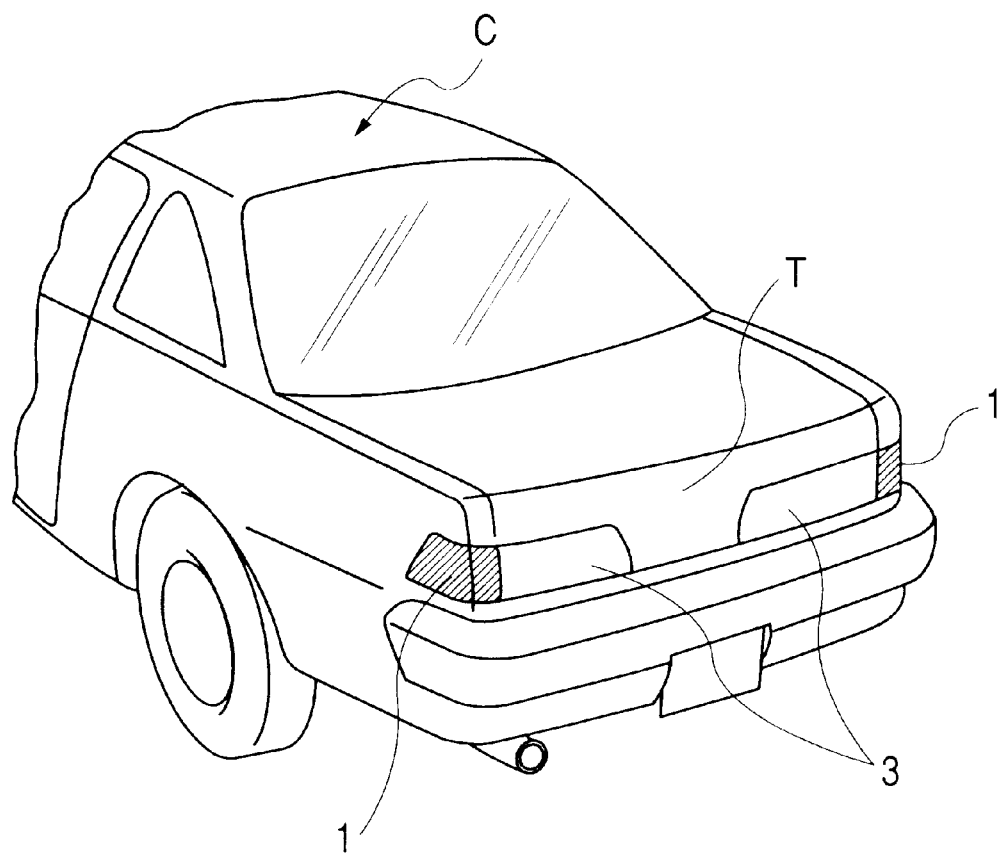
FIG. 1 shows the rear part of an automobile equipped with the turn signal lamp having bulbs according to the invention.
Figure 2:
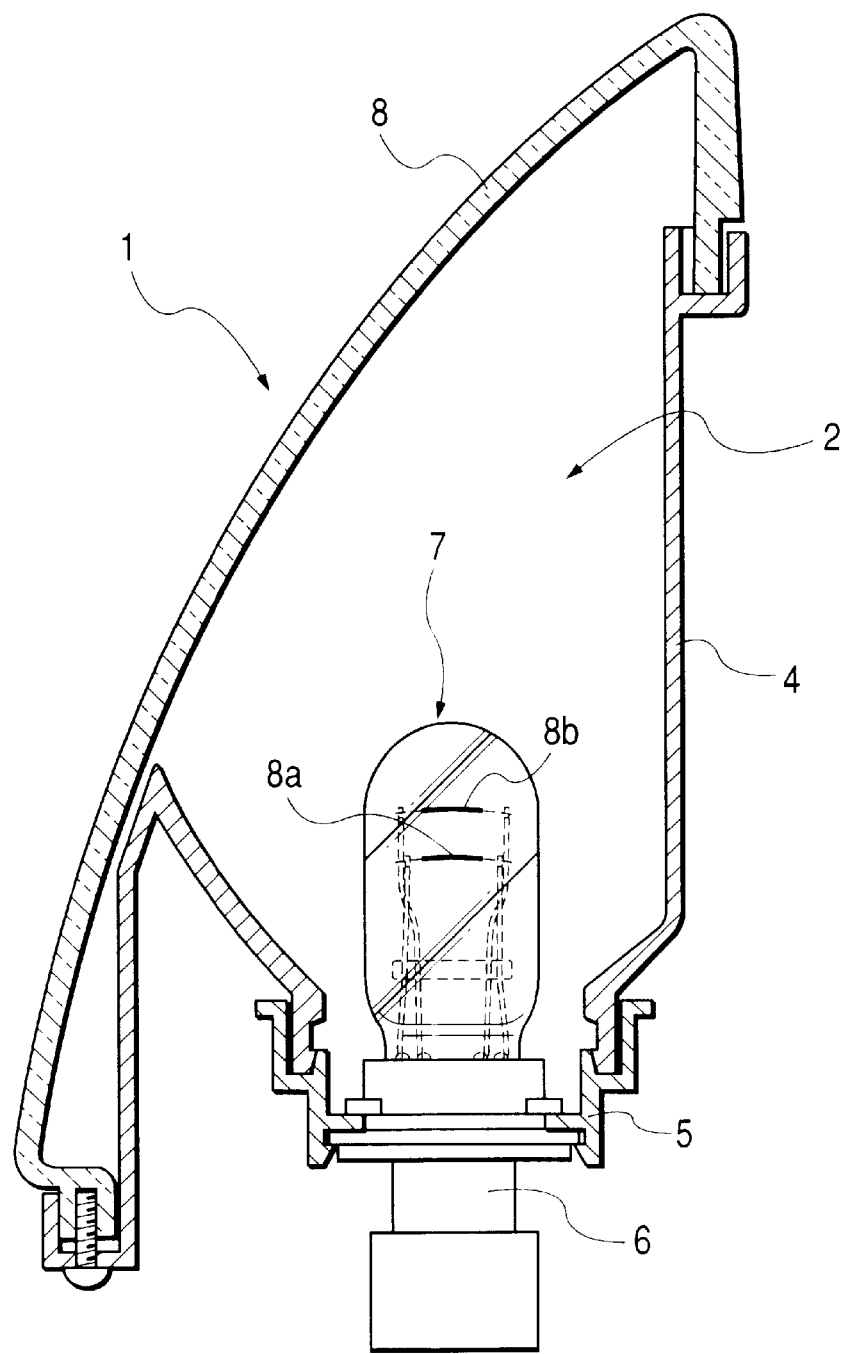
FIG. 2 is a horizontal cross sectional view of a turn signal lamp as shown in FIG. 1.

Based on FIGS. 1 and 2 of the attached drawings, explanation will start from suited and typical embodiments of turn signal lamps provided with the bulbs of the invention.

The bulb of the invention is mainly applied to the turn signal lamps. The turn signal lamps 1 are generally furnished in a pair of left and right side bodies of tail lamps 3, 3 equipped at a rear part "T" of a car "C" in FIG. 1.

The turn signal lamps 1 are used when a car changes a running route, or turns left or right. The turn signal lamps 1 turn on and off so as to issue an orange color, and are equipped at a front part (not shown) of the car. By the way, no limitation is made as to the places on the vehicle where the turn signal lamps 1 are employed. That is, the turn signal lamps 1 may be at the front, rear, or sides of the vehicle.

FIG. 2 shows a horizontal cross sectional view of a turn signal lamp 1, wherein reference numeral 4 designates a lamp body basically formed with a synthetic resin material. At a predetermined front opening of the lamp body 4, a front lens 8 is located and fixed by bonding, by screwing, or by other manners of fixation, so as to form a light chamber 2.

In the light chamber 2, a bulb 7 is inserted in a bulb socket 6 that is secured at a rear top portion of the lamp body 4 via a sealing member 5. The bulb 7 is capable of turning on and off. Numerals 8a and 8b designate filaments that are used as luminous parts, or light sources. This embodiment exemplifies a bulb 7 of the so-called double filament type because it is furnished with two filaments 8a, 8b.

One of the filaments 8a, 8b is always lit when the vehicle's lamps are lit. This filament provides an easy indication of the car's width, for example. On the other hand, the other filament turns on and off as needed to let other cars or walkers know that the vehicle intends to change its route, turn left, or turn right.

The invention is not limited to the bulb 7 of the double filament type, but may be applied to a bulb of the single filament type (not shown).

A composition of the bulb 7 will be explained with reference to FIG. 3, which shows part of the bulb as being cut to expose a cross section in a part of a glass pipe thereof.

The bulb 7 is a bulb of the pipe type (T type), and is furnished with a glass pipe 9 and a flat sealing part 13. The glass pipe 9 comprises soda lime glass, for example, for composing a transparent air-sealing container. The flat sealing part 13 is inserted in the bulb socket 6. This sealing part 13 may be formed not only by crushing a glass tube, but also by a glass stem, or by attaching a base to the sealing part.

Lead wires extend inside and outside of the bulb 7. Between the inside lead wires 11a, 11a, and between the inside lead wires 12a, 12a, there are disposed respective expanded filaments 8a, 8b of tungsten shaped in a coil. The outside lead wires 11b, 12b are led outside of the bulb 7, and are wound on the sealing part 13 so that these lead wires 11b, 12b do not contact each other.

Numeral 14 is an air release pipe that penetrates through the sealing part 13, whereas numeral 15 is an engaging convex portion formed at an outer face, and numeral 16 is a glass bridge securing the inside lead wires 11a, 12a.

Figure 3:
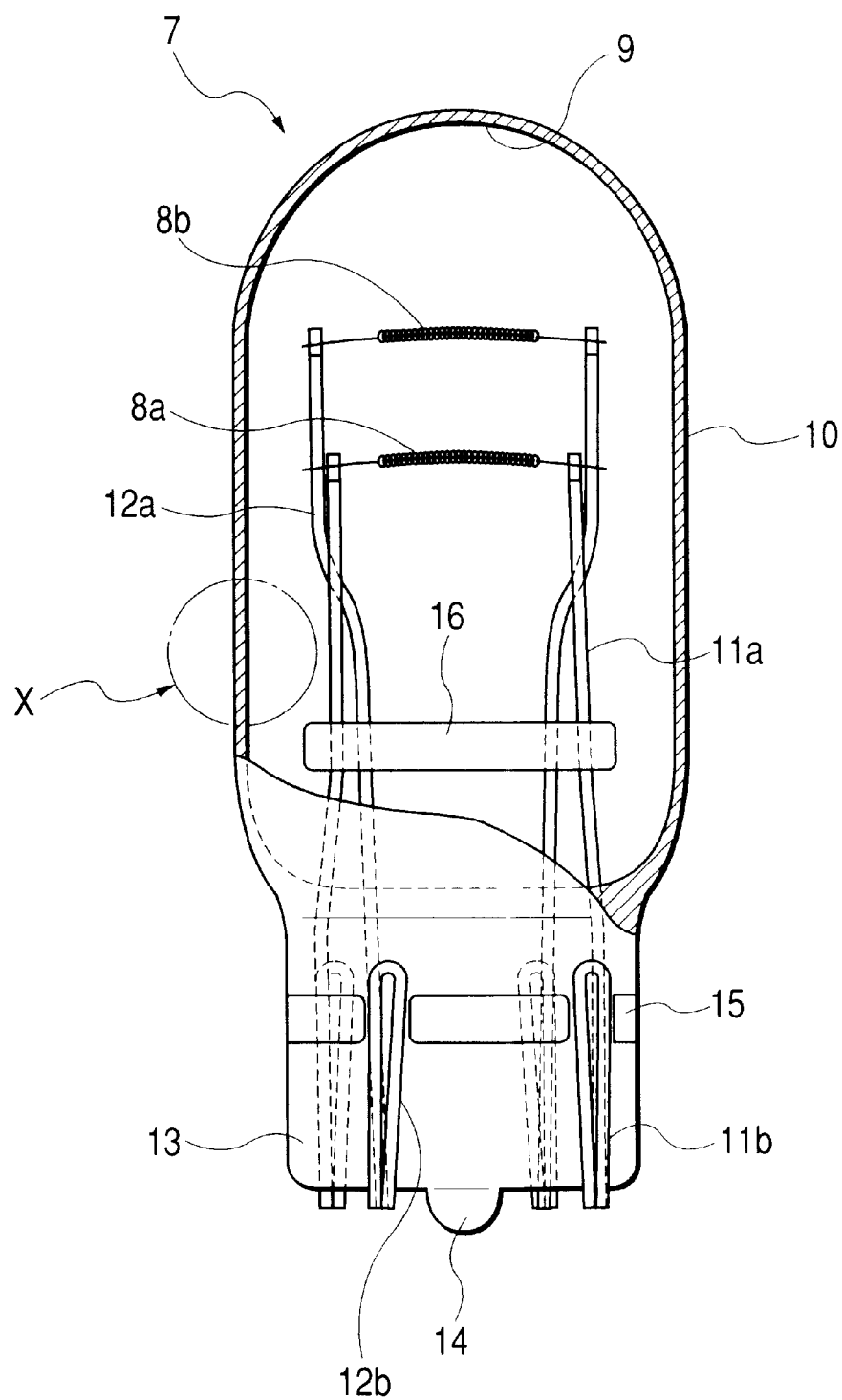
FIG. 3 is a cross sectional view of the bulb used in the turn signal lamp of FIG. 2.
Figure 4:
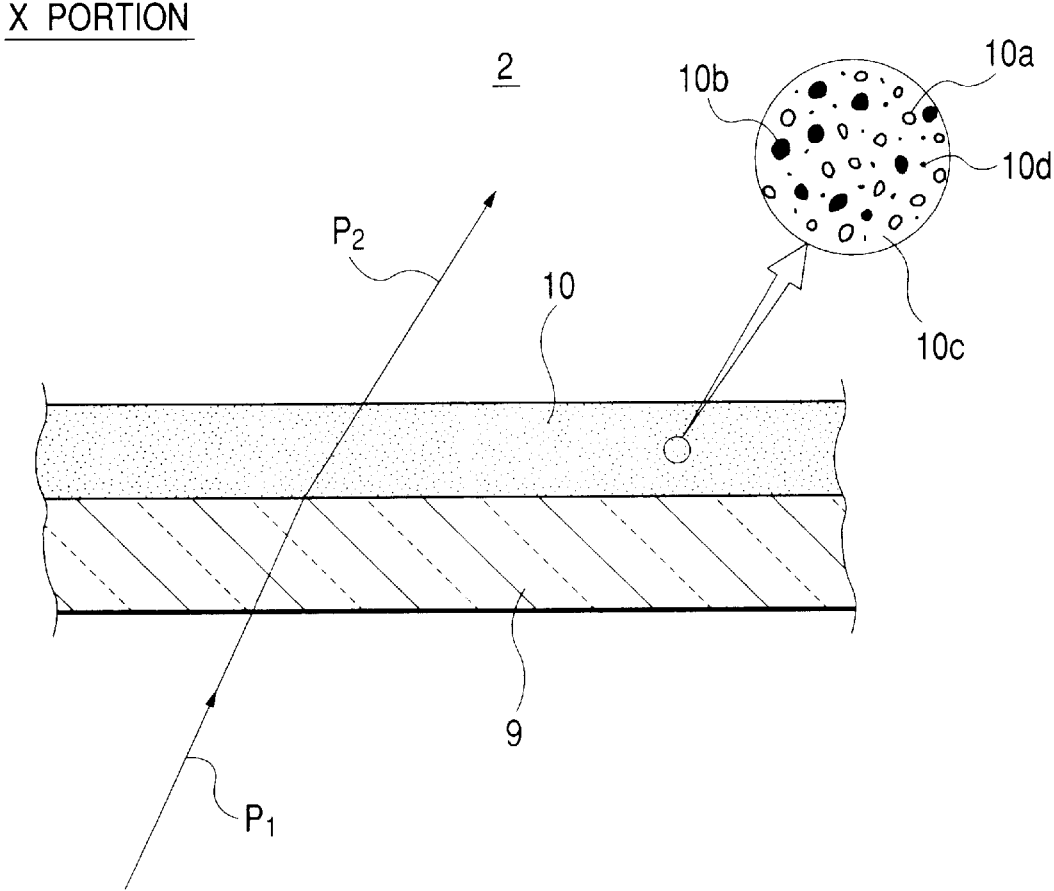
FIG. 4 is an enlarged view of portion X as denoted in FIG. 3.

As shown in FIG. 3 and FIG. 4, in enlarged part X, the glass pipe 9 of monochrome transparency is coated, as by film-forming, on its outer surface with umber paint 10. The umber paint 10 is film-formed by dipping the glass pipe 9 in said paint until it reaches a predetermined depth, then pulling the pipe 9 up, and carrying out drying at predetermined temperatures for predetermined times. Film-forming methods other than dipping are known and are acceptable. Such other film-forming methods may include, for example, air spray coating, disk coating, or spin coating, and the like.

The thickness of the umber paint 10 may be appropriately selected in accordance with the various required standards of chromaticity such as, for example, the Japanese Industrial Standards (JIS D5500), the North American standards, the European standards, or the International Standards of the International Proof Committee.

If the film thickness is less than 1.5 $\mu$m, the chromaticity is insufficient, and it is difficult to satisfy desired standards of chromaticity. On the other hand, if it is more than 3.0 $\mu$m, cracks easily occur in the coated film. Accordingly, preferable film thickness of the umber paint 10 fall within the range of 1.5 $\mu$m to 3.0 $\mu$m.

A preferable composition of the umber paint 10 will be explained next.

The umber paint 10 comprises a base 10c, pigments as coloring components, and additives as dispersing agent. The base 10c is composed of an organic solvent and a transparent base resin such as silicon-, acrylsilicone-, or polyestersilicones-groups having film formability. The pigment is composed such that a desired chromaticity is obtained by mixing red pigment and yellow pigment at a predetermined ratio as described later.

In the invention, with respect to the pigment componentsumber, a red pigment 10a as iron oxide ($\alpha$-$Fe_2O_3$), and a yellow pigment 10b composed of acetylacetone iron chelate, are combined to form an orange colored film that is formed on the outer surface of the glass pipe 9. By this structure, a white light $P_1$ issued from the filaments 8a, 8b is changed into an orange colored light $P_2$ when the white light passes through the bulb 7.

Upon making inspection tests for comparing light fluxes, it was confirmed that acetylacetone iron chelate of the yellow pigment 10b—adopted in the umber paint 10 according to the invention—could secure a light flux of around 1.15 to 1.5 times in comparison with various yellow pigments now in use.

From this, it was confirmed that acetylacetone iron chelate is a yellow pigment especially excellent in transparency. That is, it was found that acetylacetone iron chelate had a minimum capacity to shield the light $P_1$ issued from the filaments 8a, 8b. Incidentally, chelate metals other than iron, such as cobalt or nickel, may be used. But those other chelate metals are not conducive to forming transparent base resins, and result in insufficient transparency.

Because the umber paint 10 of the invention has excellent transparency, it does not directly lower the luminous intensity of the light $P_2$ from the bulb 7. Further, indirectly, it may increase the heat resistance of the bulb 7 by smoothening the heat dissipation within the bulb and, therefore, the umber paint may contribute to the improvement in quality of the bulb in view of luminous energy and heat resistance.

The yellow pigment 10b composed of acetylacetone iron chelate does not bring about an environmental problem, as does a chromium based pigment, and is excellent in easy handling.

When the bulb lights, a temperature of the light chumber 2 exceeds 250° C. Particularly, in the bulb 7 of the double filament type (see FIG. 3), the light-chumber temperature becomes more than 300° C. Accordingly, the umber paint 10—to be used on the double filament type bulb 7—must have a higher heat resistance. If the bulb 7 possesses insufficient heat resistance, during use the umber paint 10 may crack, peel or fade in color, resulting in a disadvantageous reduction in the bulb's performance.

By using the umber paint 10 in combination with zirconium oxychloride 10d (see FIG. 4), a further increase in the transparency of the umber paint may be achieved. As a result, this umber paint—which could, without the addition of zirconium oxychloride, provide a heat resistance of around only 250° C.—could now at once secure a heat resistance of 300 to 350° C. It is preferable to add, to the umber paint, zirconium oxychloride 10d in an amount of from 1.0 to 1.2 wt % of the paint.

Therefore, in comparison with a bulb of the single filament type (not shown), a new umber paint according to the invention is sufficiently applicable to a bulb 7 of the double filament type wherein the temperature in the light chumber is higher than that in the former.

In the Federal Automobile Safety Standards (Item 108 of FMVSS) as the vehicle standards of North America, bulbs of double filament type are generally used as turn signal lamps. Thus, it may be assumed that, in the case of North America, lamps for displaying widths or lengths of car—such as side marker lamps—may be umber in color. And if one bulb can be used as both the turn signal lamp and the marker lamp, costs are advantageously low.

The inventors made inspection tests as to the ratio of pigments enabling a chromaticity that satisfies the chromaticity standards of North America (SAE J588).

FIG. 5 is a graph showing, in a vertical axis, the "y" component of x, y, z (chromaticity coordinate changing values), and showing on the horizontal axis, the "X" component (corresponding to X, Y, Z of the three excitation values in colors of the light source). A range shown with "U" satisfies the chromaticity standards of North America (SAE J588; y=0.39, y=0.79–0.67x, y=x–0.12). On the other hand, an oblique lined range shown with "E" satisfies the European standards (ECE Reg. No. 37; $0.398 \leq y \leq 0.429$, $z \leq 0.007$).

As a result of the inspection tests, it was confirmed that when the thickness of the inventive umber paint 10 was 2.0 μm, if the mixing ratio of the red iron oxide pigment and the yellow pigment of acetylacetone iron chelate ranged from 1:1.5 to 1:2.8 in weight ratio, the chromaticity surely satisfied not only the North American standards (range of "U" in FIG. 5) but also satisfied the European standards (range of "E" in the same).

The above explanation is based on the premise that the umber paint of the invention is applied to the turn signal lamp. But the inventive umber paint can be broadly employed to parking lamps, clearance lamps, side marker lamps and others.

The main effects brought about by the invention are as follows.

First, by adopting the inventive umber paint for turn signals, the luminous intensity of the light (orange colored light) issued from the bulb can be prevented from reduction, and the heat dissipation within the bulb can be smoothened. Also, by using materials of low pollution, it is environmentally preferable.

Second, by limiting the mixing ratio of the pigments within the above-described predetermined range, both the North American standard of chromaticity, and also the European standard of chromaticity can be exactly satisfied.

Third, by adding zirconium oxychloride into the inventive umber paint for turn signal lamps, the transparency of the coated film is increased, so that the luminous energy of the bulb can be increased. By increasing the transparency, the heat dissipation within the bulb is more smoothened and, therefore, it is possible to provide an umber paint capable of forming a film on a bulb of the double filament type. In other words, the invention can contribute to an enlarged range of uses for umber paint.

Fourth, by defining the film thickness within the above-described predetermined range, a chromaticity more than the fixed level can be secured and, at the same time, the coated film can be surely free from cracking.

Fifth, a turn signal bulb formed with a coated film of umber paint according to the invention, and in turn the turn signal lamp equipped with this bulb, are high in heat resistance so that the coated film is free from damages, is high in quality, and is excellent in visibility owing to the high luminous intensity. Thus, the invention contributes to traffic safety.

The present invention is not limited to the specific above-described embodiments It is contemplated that numerous modifications may be made to the umber paint, bulbs coated with the umber paint, and the turn signal lamps equipped with those bulbs, of the present invention without departing from the spirit and scope of the invention as defined in the following claims.

What is claimed is:

1. A bulb for vehicle turn signal lamps comprising a bulb and a coating thereon of an umber paint, comprising at least a red pigment and a yellow pigment, wherein the yellow pigment comprises acetylacetone metal chelate; wherein the red pigment is a red iron oxide pigment, and the weight ratio of the red iron oxide pigment to the yellow pigment ranges from 1:1.5 to 1:2.8.

2. A The bulb for vehicle turn signal lamps as set forth in claim 1, wherein the umber paint further comprises zirconium oxychloride.

3. The bulb as set forth in claim 1, characterized in that the umber paint for turn signal lamps is coated in a thickness ranging from 1.5 $\mu$m to 3.0 $\mu$m.

4. The bulb as set forth in claim 3, further comprising luminous parts that are double filaments.

5. The bulb for vehicle turn signal lamps as set forth in claim 3, further comprising zirconium oxychloride.

6. A bulb, characterized in that the bulb is coated on the surface thereof with the umber paint for turn signal lamps as set forth in claim 5.

7. The bulb as set forth in claim 6, characterized in that the umber paint for turn signal lamps is coated in a thickness ranging from 1.5 $\mu$m to 3.0 $\mu$m.

8. The bulb as set forth in claim 7, further comprising luminous parts that are double filaments.

9. The bulb as set forth in claim 6, further comprising luminous parts that are double filaments.

10. The bulb as set forth in claim 1, further comprising luminous parts that are double filaments.

* * * * *